United States Patent [19]

Kintz et al.

[11] Patent Number: 4,942,582
[45] Date of Patent: Jul. 17, 1990

[54] SINGLE FREQUENCY SOLID STATE LASER

[75] Inventors: Gregory J. Kintz; Thomas M. Baer; James D. Kafka, all of Mountain View, Calif.

[73] Assignee: Spectra-Physics, San Jose, Calif.

[21] Appl. No.: 341,922

[22] Filed: Apr. 24, 1989

[51] Int. Cl.$^5$ .......................... H01S 3/098; H01S 3/16
[52] U.S. Cl. .......................................... 372/18; 372/9; 372/10; 372/22; 372/33; 372/41
[58] Field of Search .................. 372/18, 33, 41, 9, 10, 372/22

[56] References Cited

U.S. PATENT DOCUMENTS 4,802,187 1/1989 Bonley et al. .................. 372/20

Primary Examiner—William L. Sikes
Assistant Examiner—Georgia Y. Epps
Attorney, Agent, or Firm—Lyon & Lyon

[57] ABSTRACT

A solid state laser including a block of Nd:YVO$_2$, Nd:YSAG, or Nd:YAB laser material having a cavity-defining mirror at one of its end surfaces is pumped by a laser diode pumping source having narrow bandwidth and is caused to lase in a single longitudinal mode by controlling the relationship between the pump power, the bandwidth of the lasing transition within the laser material, and the absorption depth of the pump radiation within the laser material.

26 Claims, 1 Drawing Sheet

SINGLE FREQUENCY SOLID STATE LASER

BACKGROUND OF THE INVENTION

1. Field of the Invention

The present invention relates to lasers, and more particularly, to solid state lasers. The present invention is concerned with a solid state laser having a single frequency output using a technology which is scaleable over a wide range of output power.

2. The Prior Art

Applications for single frequency output lasers are very numerous. Such lasers are useful for certain applications such as driving slave cavities, as seed lasers for larger Q-switched lasers, sources for stable frequency doubling to the visible, optical communications (coherent detection schemes) and others.

Single mode lasing has been observed in masers, gain switching lasers, and microchip lasers. Single mode lasing has also been observed in the stoichiometric crystal Nd:LiPo5 using a dye laser pumping source. More recently, single mode lasing has been observed in this crystal by utilizing diode pumping. Single frequency lasing is known using a pumping source having a power level above but very close to threshold, i.e., about 1.1 times the threshold pump power level.

Despite the limited successful achievement of single frequency lasing in solid state materials, the limiting phenomena have not heretofore been well understood, and there is thus room for improvement in single frequency solid state lasers.

BRIEF DESCRIPTION OF THE INVENTION

Single frequency lasing in solid state materials is achieved by providing a solid state laser cavity in which one cavity-defining mirror is located at the surface of a block of solid state laser material. A theoretical model is disclosed wherein the pump source power, the bandwidth of the lasing transition and the absorption depth of the pump power into the lasing medium may be used to achieve single longitudinal more lasing at higher values of pumping power than have been previously achievable.

According to one aspect of the present invention, a block of neodymium yttrium vanadium oxide (Nd:YVO$_2$) is placed in a laser cavity having one of its ends defined by a mirror deposited on the surface of the lasing medium. The laser material is pumped by a solid state laser diode pumping source. The naturally polarized output of the pump laser is oriented parallel with respect to the C-axis of the crystal and has an absorption depth of less than about 250 microns.

In another aspect of the present invention, either Nd:YSAG, or Nd:YAB (Yttrium aluminum borate) is caused to lase in a single longitudinal mode where the absorption depth is short.

In another aspect of the present invention, a block of solid state laser material having one of the cavity-forming mirrors deposited on one of its opposing faces is caused to lase in a single longitudinal mode by controlling the relationship between the pump power, the bandwidth of the lasing transition within the material, and the absorption depth of the pump radiation within the material. The pumping source needs to have a bandwidth narrow enough to maintain short absorption depths.

DETAILED DESCRIPTION OF A PREFERRED EMBODIMENT

The theoretical models developed as a result of and as a part of the present invention developed to describe the single frequency operation of Nd:YVO4 and other materials result from the analysis of a boundary value problem describing the population of a laser medium with a single oscillating cavity mode where the pump power is deposited in a short distance from one of the cavity mirrors. The result of the theory is an analytical expression relating several of the characteristics of the materials, bandwidth, absorption depth, and certain of the operating characteristics of the laser output, i.e., how many multiples above threshold the laser is operated, to the ability of the system to remain single frequency. The models predict several different characteristics of the laser output, including slope efficiency, and how far above threshold the laser may be operated. Several examples have demonstrated overall excellent agreement with the theory.

The nature of the doped host is critical, because if the absorption depth is too long, single frequency laser action will not occur. Nd doped hosts have been found to be satisfactory for use in the present invention.

The geometry of the laser cavity design is also critical to the production of single longitudinal mode operation. It has been found that one of the cavity-forming mirrors is preferably deposited on the block or rod of laser material.

In addition, the magnitude of the pump power is important, since there is a limit to the number of times above threshold a single longitudinal mode laser may be operated.

The present invention also relates to the scaling laws of the single longitudinal mode laser system. To scale the laser to higher power as, the threshold must be increased, either by increasing the output coupling or by increasing the mode volume.

Figure 1:
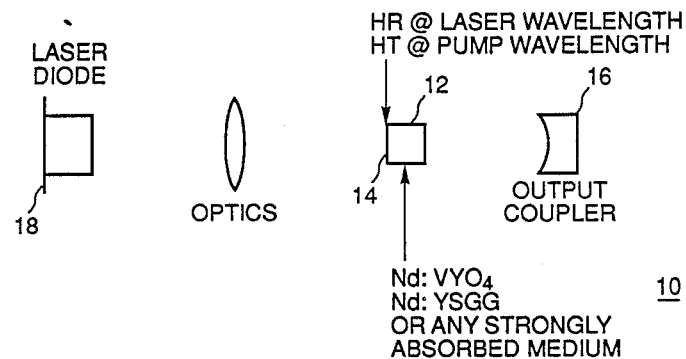
FIG. 1 is a diagram of a solid state laser having a single longitudinal mode output according to the present invention.

Referring first to FIG. 1, a solid state laser 10 includes a block of solid state laser material 12 (Nd:YVO2) having two opposing faces. A coating 14, having a high degree of reflectivity at the desired laser frequency and a high degree of transmissiveness at the pump light frequency, is deposited on the surface of one of the opposing faces of block 12 in a manner well-known to those of ordinary skill in the art. A mirror 16 is placed in optical alignment with the block 12. Mirror 16 acts as an output coupler and is thus partially transmissive in order to allow the output radiation of the laser 10 to escape from the cavity as is known in the art. A laser diode pumping source 18 is placed in optical alignment with block 12 and one or more lenses 20 are placed in the optical path of the laser diode pumping source 18 in order to collect the pump radiation and focus it into the block 12 through cavity-defining coating 14.

In a presently preferred embodiment, block 12 has a length of 2 mm, having polished ends at a 5 degree wedge to prevent any intercavity etalon effects, and is doped with Nd so as to have a pump band absorption depth of less than 250 micrometers. A Ti:Al2O3 laser has been used as a pump source at the peak of the absorption spectra at 808 nm. In addition, a laser diode array, SDL 2422, available from Spectra Diode Labs of San Jose, Calif. has been successfully used. One end of the laser rod has a highly reflective coating at 1.064 micrometers and is highly transmission at 810 nm (90%). The other end of the rod is anti-reflective coated at 1.064 nm. A 37 mm radius output coupler is used, having a 5% transmissiveness at 1.064 nm.

The threshold for the second laser mode occurs at 220 mW, approximately 15 times above threshold. As the wavelength of the pump laser is tuned off of the center of the absorption curve, the pump power at which multi-mode laser action begins decreases, even though the threshold remains constant. If the pump laser is tuned sufficiently off center of the absorption peak, the laser exhibits multi-mode operation at threshold.

Figure 2:
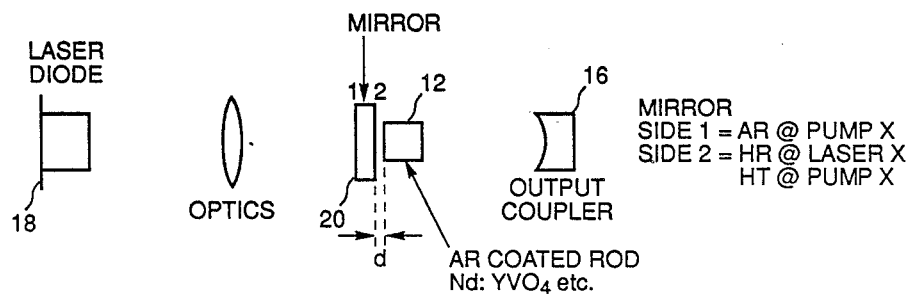
FIG. 2 is a diagram of a solid state laser having a single longitudinal mode output according to the present invention wherein the cavity forming mirror on the end of the cavity receiving the pumping radiation is separated from the block of laser material.

Referring now to FIG. 2, an alternate embodiment of the present invention is shown. Laser 10 includes a block of solid state laser material 12 (Nd:YVO2) having two opposing faces. A cavity forming mirror 20, having a high degree of reflectivity at the desired laser frequency and a high degree of transmissiveness at the pump light frequency, is located at a distance d from the surface of one of the opposing faces of block 12. The as will be discussed herein, the distance d, plus the absorption depth of the pump radiation should be carefully selected to assure single longitudinal mode operation.

A second cavity forming mirror 16 is placed in optical alignment with the block 12. Mirror 16 acts as an output coupler and is thus partially transmissive in order to allow the output radiation of the laser 10 to escape from the cavity as is known in the art. A laser diode pumping source 18 is placed in optical alignment with block 12 and one or more lenses 20 are placed in the optical path of the laser diode pumping source 18 in order to collect the pump radiation and focus it into the block 12 through cavity-defining coating 14.

Figure 3:
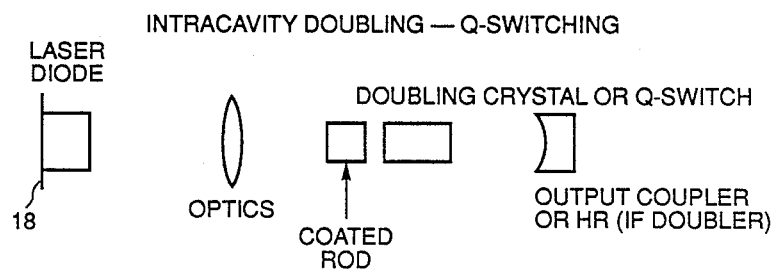
FIG. 3 is a diagram of a solid state laser having a single longitudinal mode output according to the present invention further including an intra cavity doubler or Q-switch.

Referring now to FIG. 3, a solid state laser 10 includes a block of solid state laser material 12 (Nd:YVO2) having two opposing faces. A coating 14, having a high degree of reflectivity at the desired laser frequency and a high degree of transmissiveness at the pump light frequency, is deposited on the surface of one of the opposing faces of block 12 in a manner well-known to those of ordinary skill in the art. A mirror 16 is placed in optical alignment with the block 12. Mirror 16 acts as an output coupler and is thus partially transmissive in order to allow the output radiation of the laser 10 to escape from the cavity as is known in the art. A laser diode pumping source 18 is placed in optical alignment with block 12 and one or more lenses 20 are placed in the optical path of the laser diode pumping source 18 in order to collect the pump radiation and focus it into the block 12 through cavity-defining coating 14. In one alternate embodiment of the present invention, a frequency doubling crystal 22, such as KTP, may be placed in the cavity. In another alternate embodiment, a Q-switch may be placed in the cavity as is well known in the art.

The behavior exhibited by this single longitudinal mode laser can be explained by strong spatial hole burning near the surface of one of the cavity mirrors. One aspect of the present invention is the application of the discovery that an analytical expression for the relationship between absorption depth, bandwidth, and single frequency operation may be made on the basis of several assumptions.

As another aspect of the present invention, it has been discovered that in order to achieve single longitudinal mode operation within a block of solid state laser material which is capable of single longitudinal mode operation, the absorption depth of the pump radiation within the block must be less than $$\frac{d}{2\pi} \quad [1]$$

where d = the dephasing distance. The absorption depth is defined as the distance at which approximate 70% of the pump energy is absorbed. The dephasing distance is defined as the distance from the surface of the end mirror at which two waves separated in wavelength by the full width half maximum of the gain bandwidth become 90° out of phase.

The dephasing distance may be derived as a function of the wavelength of the laser output $\lambda_0$ and the full width half maximum of the gain bandwidth $\Delta\lambda_0$ the absorption depth l and the index of refraction n of the solid state material:

$$\frac{2\pi n \Delta\lambda_0 l}{\lambda_0^2} \quad [2]$$

The dephasing distance is:

$$\frac{\lambda_0^2}{n\Delta\lambda_0} \quad [3]$$

Substituting equation [3] into equation [2] yields equation [1].

An additional aspect of the invention allows prediction of how many times above threshold the laser may be operated before it produces multi-longitudinal node output. It has been discovered that this is a complex function of the ratio r of pump power $I_p$ to the threshold pump power $I_{th}$:

$$\frac{I_p}{I_{th}} = r \quad [4]$$

the condition for single longitudinal mode is related to the function of r, f(r) as follows:

$$\left(\frac{2\pi n \Delta\lambda_0 l}{\lambda_0^2}\right)^2 f(r) \leq 1 \quad [5]$$

Where:

$$f(r) = 2r \left(\frac{(4I_S(r) + 1)^{\frac{1}{2}} - 1}{\sqrt{I_S(r)}}\right) \quad [6]$$

where:

$$I_s = \frac{1}{8}((4r - 1) - (1 + 8r)^{\frac{1}{2}})$$

$I_s$ is the circulating cavity intensity multiplied by the inverse of the saturation intensity, as reported in Casperson, *Laser Power Calculations: sources of error*, Applied Optics, Vol. 19, No. 3, Feb. 1, 1980, p. 422.

By solving equation [6] for a given r, the single-frequency condition [eg 5] can be calculated to determine if for that r, the single-frequency condition is still valid.

Those of ordinary skill in the art should realize that several other energy transfer effects, resonant energy transfer and upconversion, could also affect the single frequency operation in these types of lasers, however these effects are not necessary to obtain single-frequency operation. Resonant energy transfer, diffusion, could increase the number of times above threshold one could operate the laser system and at the same time the efficiency of the system would increase. Upconversion also has the potential to increase the number of times above threshold one could operate the laser but the efficiency would decrease. In the section on experimental results the agreement with the theory is excellent, thus it is unlikely the energy transfer effects are playing a strong role in the operation of the laser except in the case where the effects cancel each other out.

What is claimed is:

1. A solid state laser having a single longitudinal mode output at a selected laser output wavelength, including:
    a block of solid state laser material having a cavity-forming mirror coating on one of two opposing faces,
    a pumping source for providing pump radiation at a wavelength such that its absorption depth in said block of solid state laser material is less than the dephasing; distance in said block of solid state laser material at said selected laser output wavelength divided by $2\pi$,
    said cavity-forming mirror having a high reflectivity at said selected laser output wavelength and a high transmissiveness at the wavelength of said pump radiation,
    means for collecting said pump radiation emitted from said pump source and for directing it into the one of the opposed ends of said block of solid state laser material having said cavity-forming mirror coating, and
    an output coupler optically aligned with said block of solid state laser material such that said cavity-forming mirror coating, said block of solid state laser material and said output coupler form a cavity, said output coupler being partially transmissive a said laser output wavelength.

2. The solid state laser of claim 1 wherein said block of laser material is made from Nd:YVO$_2$.

3. The solid state laser of claim 1 further including a Q-switch located between said block of solid state laser material and said output coupler.

4. The solid state laser of claim 1 further including a frequency doubling crystal located between said block of solid state laser material and said output coupler.

5. The solid state laser of claim 4 wherein said frequency doubling crystal is KTP.

6. The solid state laser of claim 1 wherein said block of laser material is made from Nd:YSAG.

7. The solid state laser of claim 6 further including a Q-switch located between said block of solid state laser material and said output coupler.

8. The solid state laser of claim 6 further including a frequency doubling crystal located between said block of solid state laser material and said output coupler.

9. The solid state laser of claim 8 wherein said frequency doubling crystal is KTP.

10. The solid state laser of claim 1 wherein said block of laser material is made from Nd:YAB.

11. The solid state laser of claim 10 further including a Q-switch located between said block of solid state laser material and said output coupler.

12. The solid state laser of claim 10 further including a frequency doubling crystal located between said block of solid state laser material and said output coupler.

13. The solid state laser of claim 12 wherein said frequency doubling crystal is KTP.

14. A solid state laser having a single longitudinal mode output at a selected laser output wavelength, including:
    a block of solid state laser material having two opposing faces,
    a cavity-forming mirror optically aligned with one of the opposing faces of said block,
    a pumping source for providing pump radiation at a wavelength such that its absorption depth in said block of solid state laser material is less than the dephasing distance in said block of solid state laser material at said selected laser output wavelength divided by $2\pi$,
    said cavity forming-mirror having a high reflectivity at the said selected laser output wavelength and a high transmissiveness at the wavelength said pump radiation, said cavity-forming mirror being spaced apart from said block of solid state laser material by a distance such that the sum of said distance and the absorption depth of said pump radiation in said block of solid state laser material is less than the dephasing distance of pump radiation in said block of solid state laser material,
    means for collecting said pump radiation emitted from said pump source and for directing it into the one of the opposed ends of said block of solid state laser material located nearest to said cavity-forming mirror, and
    an output coupler optically aligned with said block of solid state laser material such that said cavity-forming mirror, said block of solid state laser material and said output coupler form a cavity, said output coupler being partially transmissive at said laser output wavelength.

15. The solid state laser of claim 14 wherein said block of laser material is made from Nd:YVO$_2$.

16. The solid state laser of claim 14 further including a Q-switch located between said block of solid state laser material and said output coupler.

17. The solid state laser of claim 14 further including a frequency doubling crystal located between said block of solid state laser material and said output coupler.

18. The solid state laser of claim 17 wherein said frequency doubling crystal is KTP.

19. The solid state laser of claim 14 wherein said block of laser material is made from Nd:YSAG.

20. The solid state laser of claim 14 further including a Q-switch located between said block of solid state laser material and said output coupler.

21. The solid state laser of claim 14 further including a frequency doubling crystal located between said block of solid state laser material and said output coupler.

22. The solid state laser of claim 21 wherein said frequency doubling crystal is KTP.

23. The solid state laser of claim 14 wherein said block of laser material is made from Nd:YAB.

24. The solid state laser of claim 14 further including a Q-switch located between said block of solid state laser material and said output coupler.

25. The solid state laser of claim 14 further including a frequency doubling crystal located between said block of solid state laser material and said output coupler.

26. The solid state laser of claim 25 wherein said frequency doubling crystal is KTP.

* * * * *

UNITED STATES PATENT AND TRADEMARK OFFICE
CERTIFICATE OF CORRECTION

PATENT NO. : 4,942,582
DATED : July 17, 1990
INVENTOR(S) : Gregory J. Kintz; Thomas M. Baer; James D. Kafka It is certified that error appears in the above-identified patent and that said Letters Patent is hereby corrected as shown below:

In The Abstract

Line 1, delete "$Nd:YVO_2$" and substitute -- $Nd:YVO_4$ --.

Column 1, lines 47-48, delete "$Nd:YVO_2$" and substitute -- $Nd:YVO_4$ --.

Column 2, line 55, delete "Nd:YVO2" and substitute -- $Nd:YVO_4$ --.

Column 3, line 28, delete "Nd:YVO2" and substitute -- $Nd:YVO_4$ --.

Column 3, lines 48-49, delete "Nd:YVO2" and substitute -- $Nd:YVO_4$ --.

Column 5, line 58, delete "$Nd:YVO_2$" and substitute -- $Nd:YVO_4$ --.

Column 6, line 55, delete "Nd:YVO2" and substitute -- $Nd:YVO_4$ --.

Signed and Sealed this

Seventh Day of January, 1992

Attest:

HARRY F. MANBECK, JR.

*Attesting Officer*      *Commissioner of Patents and Trademarks*